United States Patent [19]

Reed

[11] Patent Number: 5,139,377

[45] Date of Patent: Aug. 18, 1992

[54] TOGGLE TYPE FASTENER

[76] Inventor: Charles R. Reed, 54745 C.R. 17 South, Elkhart, Ind. 46516-5382

[21] Appl. No.: 802,483

[22] Filed: Dec. 5, 1991

[51] Int. Cl.⁵ ............................................. F16B 21/00
[52] U.S. Cl. .................................... 411/340; 411/437
[58] Field of Search ............... 411/340, 341, 342, 343, 411/344, 345, 346, 347, 436, 437; 402/63, 67

[56] References Cited

U.S. PATENT DOCUMENTS

| | | |
|---|---|---|
| 867,799 | 10/1907 | Cook . |
| 2,144,895 | 1/1939 | Place ................................ 411/342 |
| 2,532,040 | 11/1950 | Seely . |
| 2,908,196 | 10/1959 | Apfelzweig . |
| 2,933,969 | 4/1960 | Huyssen . |
| 4,009,634 | 3/1977 | Barmore ........................... 411/340 |
| 4,047,462 | 9/1977 | Hurtig . |
| 4,196,883 | 4/1980 | Einhorn et al. . |
| 4,283,986 | 8/1981 | Peterson et al. . |
| 4,285,264 | 8/1981 | Einhorn . |
| 4,398,855 | 8/1983 | Hultquist . |
| 4,449,873 | 5/1984 | Barth . |
| 4,502,826 | 3/1985 | Fafard . |

*Primary Examiner*—Rodney M. Lindsey
*Attorney, Agent, or Firm*—Thomas J. Dodd

[57] ABSTRACT

A fastener which includes a threaded shank and a head. An anchor is pivotally connected to the threaded shank by a dimpled thread and is designed to pivot after the leading edge has cleared the mounting surface.

2 Claims, 3 Drawing Sheets

TOGGLE TYPE FASTENER

FIELD OF THE INVENTION

This invention relates to fasteners, and will have special application to self-anchoring fasteners.

BACKGROUND OF THE INVENTION

Self-anchoring fasteners are useful commodities, particularly in hanging heavy objects on walls or suspending them from ceilings. The most widely used fasteners of this type typically include toggle jointed anchor members which require a pre-drilled hole in the support facing which is much larger than the diameter of the shank. This causes fasteners of this type to be wobbly and relatively weak in terms of support strength.

Some self-anchoring fasteners designed to enhance or supplant the above devices are disclosed in the attached prior art statement. Most of the devices shown utilize some form of retainer to hold the anchor member in an abutting relationship with the shank until the anchor has passed through the support fairing. These anchor members are usually held onto the shank by the sharp edges of the anchor against the fastener threads when the anchor pivots into its securement position.

SUMMARY OF THE INVENTION

The self-anchoring fastener of this invention enhances the performance o the fastener by providing a dimpled thread connection of the anchor to the fastener shank. This connection allows the fastener to maintain a very slim profile which completely eliminates the need for the pre-drilled hole. Since the diameter of the hole is nearly the same size as the fastener diameter, wobble and instability of the fastener are highly reduced.

Accordingly, it is an object of this invention to provide for a novel and improved self-anchoring fastener.

Another object is to provide for a self-anchoring fastener which may be driven directly into a support facing.

Another object is to provide for a self-anchoring fastener which reduces fastener wobble and has increased support strength.

Other objects will become apparent upon a reading of the following description.

BRIEF DESCRIPTION OF THE DRAWINGS

A preferred embodiment of the invention has been depicted for illustrative principles only wherein.

DESCRIPTION OF THE PREFERRED EMBODIMENT

Figure 1:
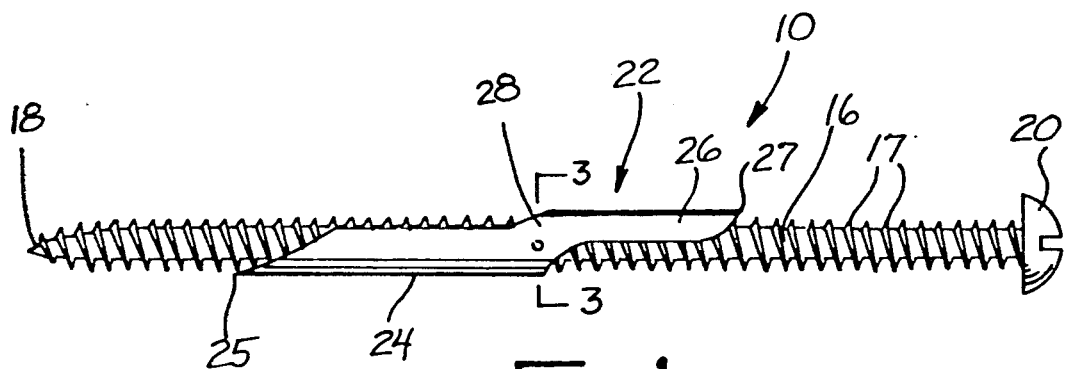
FIG. 1 is a side elevation view of the fastener of this invention.

The preferred embodiment herein described is not intended to be exhaustive or to limit the invention to the precise form disclosed. It is chosen and described to explain the principles of the invention and its application and practical use to enable others skilled in the art to utilize the teachings.

Referring now to the drawings, reference numeral 10 refers generally to the self-anchoring, toggle type fastener of this invention. Fastener 10 is adapted to be driven through a support facing 11 such as wall 12 or ceiling (not shown) and provides a means by which to hang or suspend various articles (not shown) in the home, garage, or workplace.

Fastener 10 includes a threaded shank 16 which may have a tapered terminal end 18 to allow the fastener to be driven through facing 11 or may have a flattened end which is inserted through a pre-drilled hole (not shown) in the facing. A head 20 is integrally formed with shank 16 and may take on a number of configurations such as the screw head shown, a hook, bolt head, or any other fastener head depending upon the intended use of the fastener. It should be noted that the configuration and size of shank 16 and head 20 not critical to the subject invention and the type of fastener shown is for illustrative principles only.

Anchor 22 is adjustable connected to shank 16 as shown. Anchor 22 is generally of one piece construction defined by opposite semi-cylindrical segments 24, 26 connected integrally by web portion 28. A hole 30 is defined between segments 24, 26 and allows anchor 22 to be fitted onto shank 16. A dimpled thread 32 is formed in web portion 28 and mates with shank threads 17 to provide for a positive securement of anchor 22 to shank 16.

Figure 2:
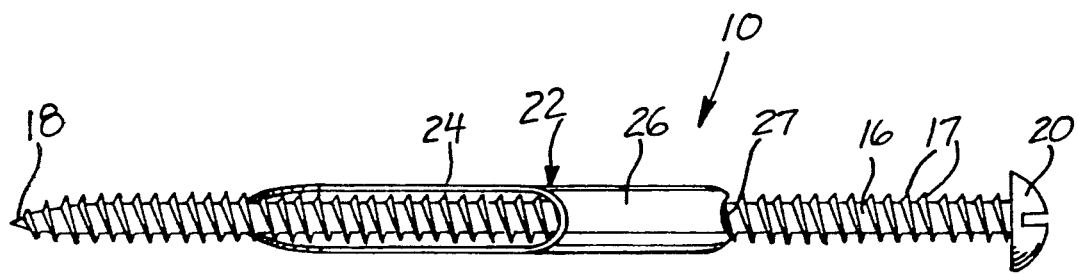
FIG. 2 is a top elevation view of the fastener of this invention.
Figure 3:
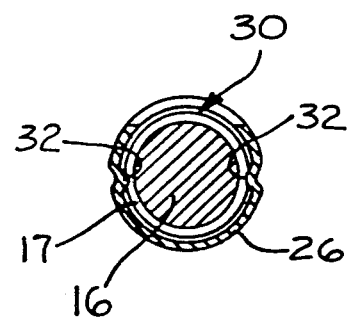
FIG. 3 is a cross-sectional view taken along line 3—3 of FIG. 1.
Figure 4:
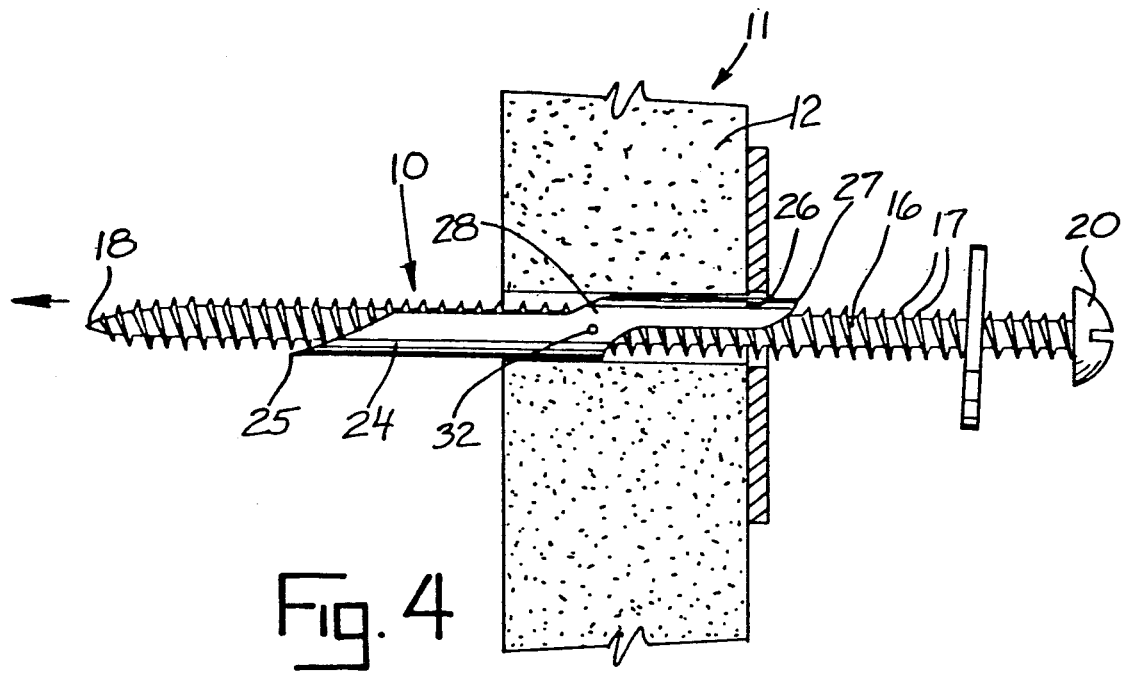
FIGS. 4-6 are sequential fragmentary side elevation views of the fastener shown in use.
Figure 5:
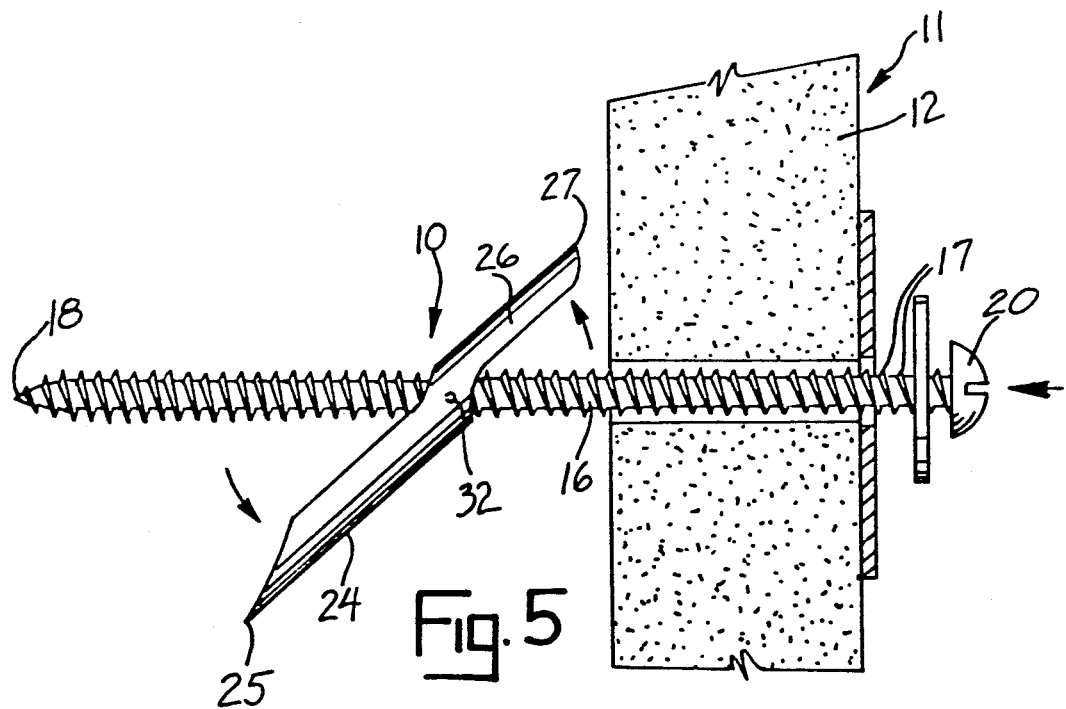
Figure 6:
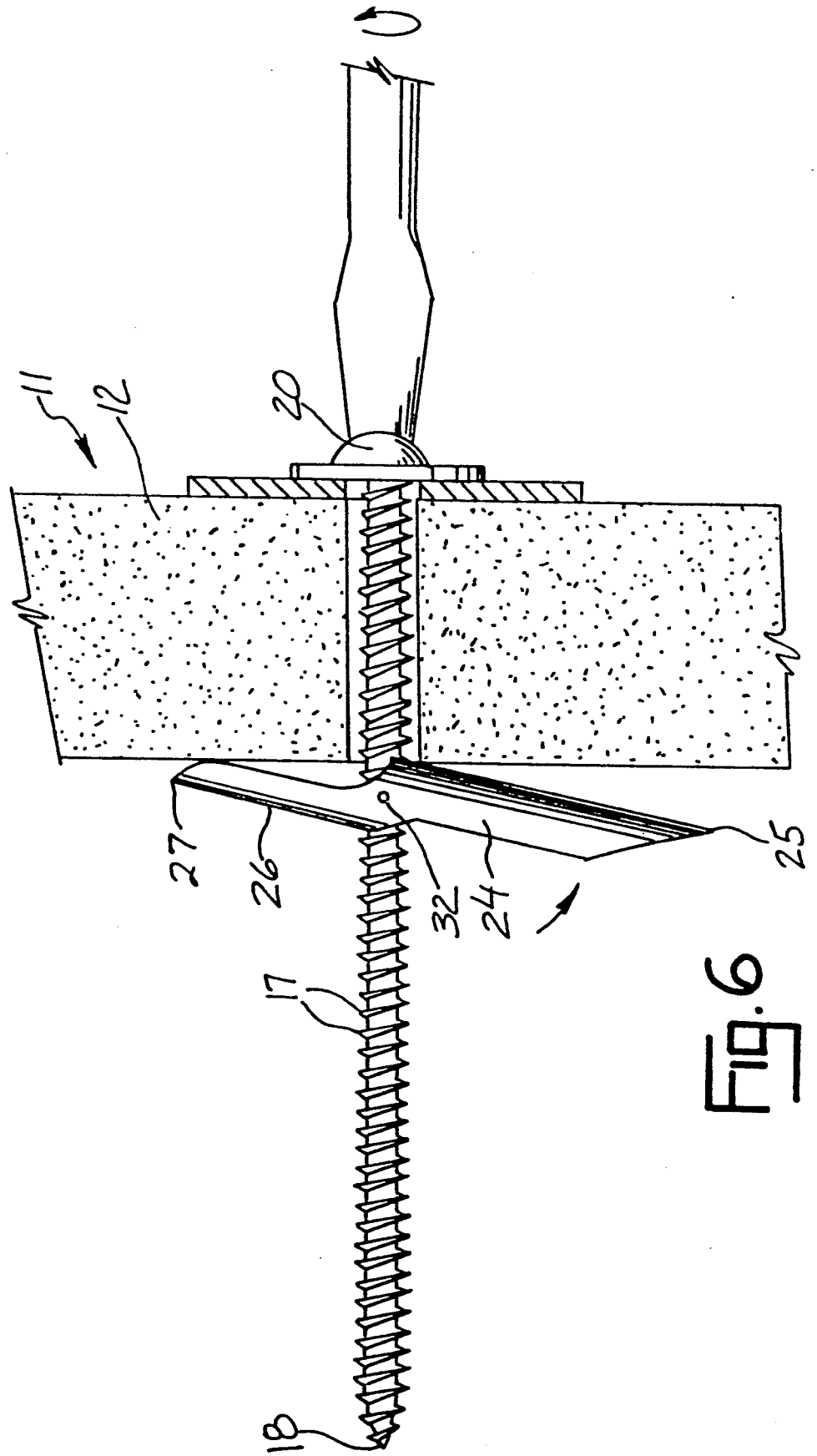

FIGS. 2 and 3 illustrate fastener 10 in use. In its initial insertion orientation, anchor segments 24, 26 closely overlie shank 16 in order to provide a slim overall profile of fastener 10. This allows the fastener 10 to be driven directly through the facing 11 or inserted therethrough by way of a pre-drilled hole (not shown) of essentially the same diameter as that of shank 16. Segment 24 has a pointed terminal edge 25 of facilitate insertion of the fastener into and through facing 11.

As the edge 27 of anchor segment 26 clears the inner edge of facing 11, the anchor 22 pivots under the influence of gravity to an orientation generally perpendicular to shank 16. Shank 16 is then turned until anchor 22 contracts the inner edge of facing 11. During this procedure, dimpled thread 32 acts as both a securement means for fixing the anchor 22 to shank 16 and also as a follower to allow the anchor to remain drawn tight against the inner edge of facing 11. When so tightened and a load applied, anchor 22 acts like the spring loaded catch of a conventional toggle bolt which allows the facing 11 to bear the full weight of the article to be hung.

It is understood that the invention is not limited to the above details, but may be modified within the scope of the following claims.

I claim:

1. In a self-anchoring fastener including a threaded shank, an anchor member connected to said threaded shank, said anchor member constituting means for bearing against an inside surface of a support facing wherein a load carried by said fastener is borne by the facing, the improvement wherein said anchor member includes first and second integral segments connected by a web, said anchor member pivotable between a driving position with said segments closely overlying said shank and a work position with the segments oriented generally perpendicular to the shank, a dimpled thread formed in said web and mating with said threaded shank to secure the anchor member to the shank.

2. The self-anchoring fastener of claim 1 and a head connected to said shank at one end thereof, another end of said shank including a tapered portion wherein driving of said fastener through said facing is facilitated.

* * * * *